United States Patent [19]
Chin

[11] Patent Number: 5,118,762
[45] Date of Patent: Jun. 2, 1992

[54] STYRENE-ISOPRENE-STYRENE BLOCK COPOLYMER COMPOSITION FOR LOW VISCOSITY LOW TEMPERATURE HOT MELT ADHESIVES

[75] Inventor: Steven S. Chin, Houston, Tex.

[73] Assignee: Shell Oil Company, Houston, Tex.

[21] Appl. No.: 510,905

[22] Filed: Apr. 11, 1990

[51] Int. Cl.$^5$ ............... C08F 297/04; C08L 53/02
[52] U.S. Cl. ............................. 525/314; 525/97; 525/98
[58] Field of Search ..................... 525/314, 97, 98

[56] References Cited

U.S. PATENT DOCUMENTS

| | | | |
|---|---|---|---|
| 3,078,254 | 2/1963 | Zelinski et al. | 260/45.5 |
| 3,135,716 | 6/1964 | Uraneck et al. | 260/45.5 |
| 3,149,182 | 9/1964 | Porter | 260/879 |
| 3,231,635 | 1/1966 | Holden et al. | 260/880 |
| 3,468,972 | 9/1969 | Hsieh | 260/836 |
| 3,577,398 | 5/1971 | Pace et al. | 260/85.3 |
| 3,594,452 | 7/1971 | De La Mare et al. | 260/880 |
| 3,595,941 | 7/1971 | Farrar et al. | 260/879 |
| 3,614,836 | 10/1971 | Snyder et al. | 36/2.5 |
| 3,753,936 | 8/1973 | Marrs | 260/27 R |
| 3,823,203 | 7/1974 | De La Mare | 525/314 |
| 3,880,953 | 4/1975 | Downey | 260/876 B |
| 3,917,607 | 11/1975 | Crossland et al. | 260/28.5 B |
| 3,932,330 | 1/1976 | Lakshmanan | 260/27 BB |
| 3,954,692 | 5/1976 | Downey | 260/33.6 AQ |
| 4,117,037 | 9/1978 | Hines | 525/314 |
| 4,148,771 | 4/1979 | Nash | 525/314 |
| 4,163,764 | 8/1979 | Nash | 525/314 |
| 4,391,949 | 7/1983 | St. Clair | 525/314 |
| 4,526,577 | 7/1985 | Schmidt, Jr. et al. | 604/365 |
| 4,944,993 | 7/1990 | Raykovitz et al. | 428/290 |
| 4,944,994 | 7/1990 | Flanagan | 428/290 |

FOREIGN PATENT DOCUMENTS

| | | |
|---|---|---|
| 55-104373 | 8/1980 | Japan . |
| 56-090849 | 7/1981 | Japan . |
| 61-120732 | 6/1986 | Japan . |
| 1211244 | 11/1970 | United Kingdom . |
| 1447419 | 8/1976 | United Kingdom . |
| 1592358 | 7/1981 | United Kingdom . |

Primary Examiner—James J. Seidleck
Assistant Examiner—Vasu S. Jagannathan
Attorney, Agent, or Firm—Donald F. Haas

[57] ABSTRACT

A low viscosity low temperature hot melt adhesive which contains a predominantly branched styrene-isoprene-styrene block copolymer composition comprised of linear polymeric blocks wherein the polystyrene block molecular weight is greater than about 12,000, the polystyrene content is about 35% or less by weight of the block copolymer composition and the molecular weight of the block copolymer composition and the coupling efficiency are chosen so that the melt viscosity of the adhesive made with the composition is less than about 3100 cps.

4 Claims, 1 Drawing Sheet

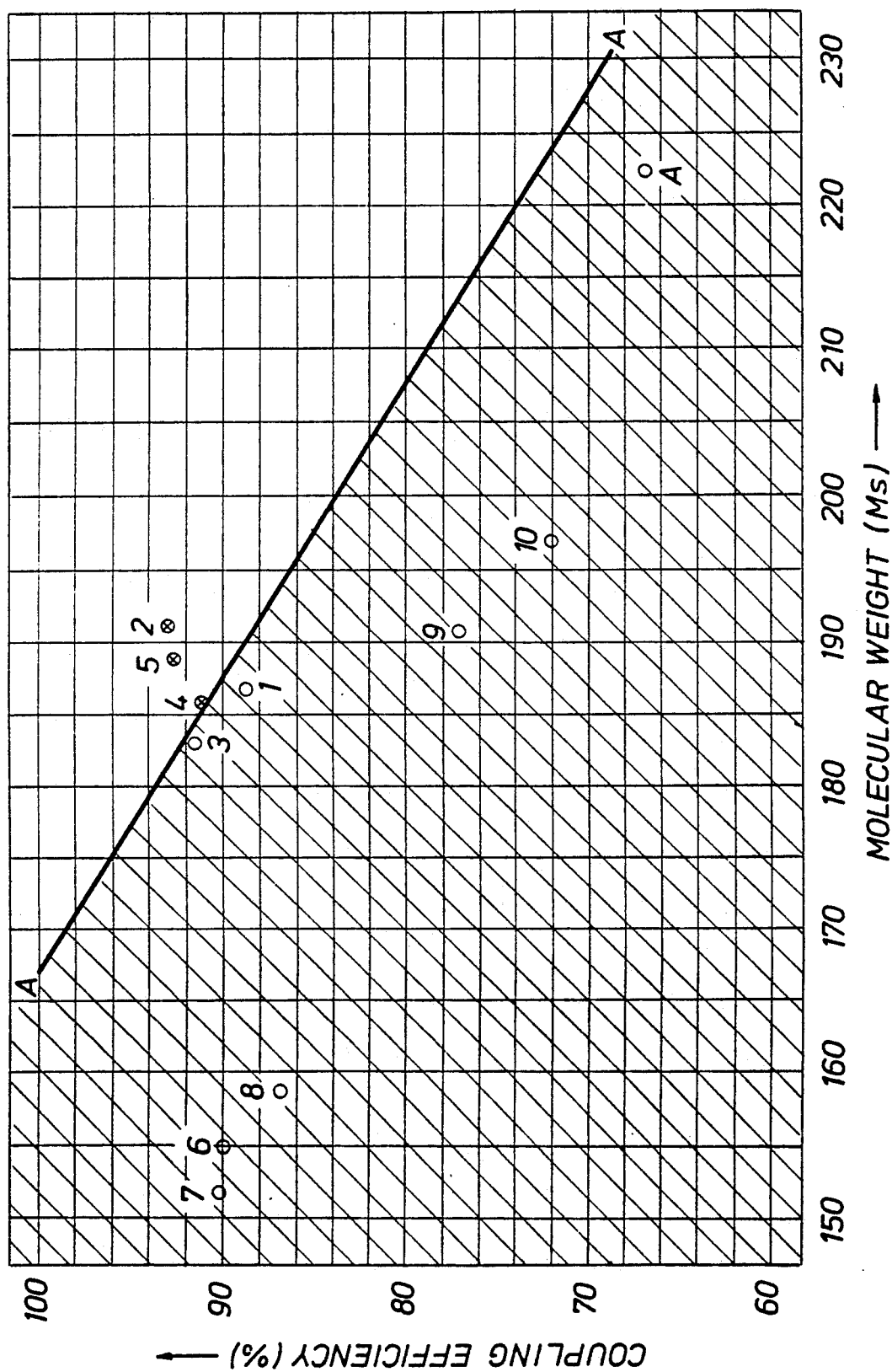

STYRENE-ISOPRENE-STYRENE BLOCK COPOLYMER COMPOSITION FOR LOW VISCOSITY LOW TEMPERATURE HOT MELT ADHESIVES

BACKGROUND OF THE INVENTION

This invention relates to a novel block copolymer composition for use in low viscosity low temperature hot melt adhesives. More particularly, it relates to predominantly branched styrene-isoprene-styrene block copolymer compositions comprised of linear polymeric blocks and adhesives made using such compositions.

It is known that a block copolymer can be obtained by an anionic copolymerization of a conjugated diene compound and an alkenyl arene compound by using an organic alkali metal initiator. Block copolymers have been produced which comprise primarily those having a general structure A—B and A—B—A wherein the polymer blocks A comprise thermoplastic polymer blocks of alkenyl arenes such as polystyrene, while block B is a polymer block of a conjugated diene such as polyisoprene. The proportion of the thermoplastic blocks to the elastomeric polymer block and the relative molecular weights of each of these blocks is balanced to obtain a rubber having unique performance characteristics. When the content of the alkenyl arene is small, the produced block copolmer is a so-called thermoplastic rubber. In such a rubber, the blocks A are thermodynamically incompatible with the blocks B resulting in a rubber consisting of two phases—a continuous elastomeric phase (blocks B) and aabasically discontinuous hard, glass-like plastic phase (blocks A) called domains. Since the A—B—A block copolymers have two A blocks separated by a B block, domain formation results in effectively locking the B blocks and their inherent entanglements in place by the A blocks and forming a network structure.

These domains act as physical crosslinks anchoring the ends of many block copolymer chains. Such a phenomena allows the A—B—A rubber to behave like a conventionally vulcanized rubber in the unvulcanized state and is applicable for various uses. For example, these network forming polymers are applicable for uses such in adhesive formulations; as moldings of shoe soles, etc.; impact modifier for polystyrene resins and engineering thermoplastics; modification of asphalt; etc.

Styrenic block copolymers are widely used to make hot melt adhesives for a wide variety of uses including diaper assembly. Hot melt adhesives based on styrenic block copolymers such as KRATON ® thermoplastic rubber provide excellent adhesion to non-polar substrates such as polethylene which are commonly used in diaper manufacture. Additionally, such styrenic block copolymer based adhesives maintain adhesion in elastically demanding applications such as disposable diapers. Relatively low styrene content (from about 15% to about 24%) styrene-isoprene-styrene block copolymers are known to be useful for adhesives for such applications.

New improvements have necessitated the development of new hot melt adhesives for use in the manufacture of disposable diapers. Diaper manufacturers now use thinner gauge polyethylene to manufacture diapers. Not only does thinner gauge polyethylene produce a more esthetically pleasing diaper but it also represents significant cost savings. However, as the gauge of the polyethylene is decreased, the likelihood of burn through of these thin layers has increased. In the past, the lower limit on the operating temperature has been defined by the temperature at which the hot melt adhesive could be applied with sufficiently low viscosity for even and proper application. Such temperatures were in the range of 300° F. to 350° F. The industry would like to operate at from about 250° F. to about 300° F.

Thus, it is clear that there is a need for a hot melt adhesive which is characterized by sufficiently low viscosity for proper application in diaper manufacture at these lower temperatures to help prevent burn through of the thinner gauge polyethylene used in the new diaper assemblies. There are new commercial products which purport to satisfy this need. However, these commercial products do not provide the balance of adhesive performance properties which is provided by the present invention, i.e., a melt viscosity of less than 3100 cps at a temperature of 350° F. and a shear adhesion failure temperature (SAFT) of greater than 71° C. The present invention provides block copolymer compositions which can be used to make adhesives satisfying these criterion.

SUMMARY OF THE INVENTION

The present invention relates to predominantly branched styrene-isoprene-styrene (S—I—S) block copolymer composiitons comprised of linerar polymeric blocks. These compositions can be used in low viscosity, low temperature hot melt adhesives. The compositions are characterized in that the polystyrene block molecular weight must be greater than about 12,000. The polystyrene content must be about 35% or less by weight of the block copolymer composition. The molecular weight and coupling efficiency of the block copolymer composition must fall to the left of line A—A in FIG. 1. The present invention also encompasses a low viscosity, low temperature hot melt adhesive comprising the above block copolymer composition and a tackifying resin.

BRIEF DESCRIPTION OF THE DRAWINGS

FIG. 1 is a graph of the coupling efficiency versus the molecular weight of the overall composition.

DETAILED DESCRIPTION OF THE INVENTION

As is well known, polymers containing both aromatic and ethylenic unsaturation can be prepared by copolymerizing one or more polyolefins, particularly a diolefin, in this case isoprene, with one or more alkenyl aromatic hydrocarbon monomers, in this case styrene. The copolymers may, of course, be random, tapered, block or a combination of these, in this case block. The blocks in the copolymers of this invention are linear.

Polymers containing ethylenic unsaturation or both aromatic and ethylenic unsaturation may be prepared using free-radical, cationic and anionic initiators or polymerization catalysts. Such polymers may be prepared using bulk, solution or emulsion techniques. In any case, the polymer containing at least ethylenic unsaturation will, generally, be recovered as a solid such as a crumb, a powder, a pellet or the like. Polymers containing ethylenic unsaturation and polymers containing both aromatic and ethylenic unsaturation are, of course, available commercially from several suppliers.

Polymers of conjugated diolefins and copolymers of one or more conjugated diolefins and one or more alkenyl aromatic hydrocarbon monomers such as predominantly branched S—I—S block copolymers are frequently prepared in solution using anionic polymerization techniques. The predominantly branched block copolymers have predominantly three arms with, for example, the following structure:

$(AB)_nBA$

In general, when solution anionic techniques are used, such S—I—S block copolymers are prepared by contacting the momoners to be polymerized simultaneously or sequentially with an organoalkali metal compound in a suitable solvent at a temperature within the range from about −150° C. to about 300° C., preferably at a temperature within the range from about 0° C. to about 100° C. Particularly effective anionic polymerization initiators are organolithium compounds having the general formula:

$RLi_n$ wherein R is an aliphatic, cycloaliphatic, aromatic or alkyl-substitued aromatic hydrocarbon radical having from 1 to about 20 carbon atoms; and n is an integer of 1 to 4.

In general, any of the solvents known in the prior art to be useful in the preparation of such polymers may be used. Suitable solvents, then, include straight- and branched-chain hydrocarbons such as pentane, hexane, heptane, octane and the like, as well as, alkyl-substituted derivatives thereof; cycloaliphatic hydrocarbons such as cyclopentane, cyclohexane, cycloheptane and the like, as well as, alkyl-substituted derivatives thereof; aromatic and alkyl-substituted aromatic hydrocarbons such as benzene, naphthalene, toluene, xylene and the like; hydrogenated aromatic hydrocarbons such as tetralin, decalin and the like; halogenated hydrocarbons, particularly halogenated aromatic hydrocarbons, such as chlorobenzene, chlorotoluene and the like; linear and cyclic ethers such as methyl ehter, methyl ethyl ether, tetrahydrofuran and the like; ketones such as methyl ketone (acetone), methyl ethyl ketone, ethyl ketone (e-pentanone) and the like.

As described in U.S. Pat. No. 4,096,203 the disclosure of which is herein incorporated by reference, usually the styrene is contacted with the initiator. Next, the living polymer in solution is contacted with isoprene. The resulting living polymer has a simplified structure A—B—Li. It is at this point that the living polymer is coupled.

There are a wide variety of coupling agents that can be employed. Any polyfunctional coupling agent which contains three reactive sites can be employed. Examples of the types of compounds which can be used include the polyepoxides, polyisocyanates, polyimines, polyaldehydes, polyketones, polyanhydrides, polyesters, polyhalides, and the like. These compounds can contain two or more types of functional groups such as the combination of epoxy and aldehyde groups, isocyanate and halide groups and the like. Various other substituents which are inert in the treating reaction can be present such as hydrocarbon radicals as exemplified by the alkyl, cycloalkyl, aryl, aralkyl and alkaryl groups and the alkoxy, aryloxy, alkythio, arylthio, and tertiary amino groups. Many suitable types of these polyfunctional compounds have been described in U.S. Pat. Nos. 3,595,941; 3,468,972, 3,135,716; 3,078,254, and 3,594,452, the disclosures of which are herein incorporated by reference. When the coupling agent has two reactive sites such as dibromoethane, the polymer will have a linear ABA structure. When the coupling agent has three reactive sites, such as trisnonylphenylphosphite (TNPP), the polymer will have a branched structure, such as $(AB)_nBA$. Since the present block copolymers are predominantly branched, a coupling agent with three reactive sites must be used. Other coupling agents which can be used include trimethoxy phosphite and triethoxy phosphite.

In the prior art, such as that exemplified by U.S. Pat. Nos. 3,595,941 and 3,468,972, the disclosures of which are herein incorporated by reference, the effort was always made to select the particular coupling agent or reaction conditions that resulted in the highest coupling efficiency. High coupling efficiency is desired herein in order to produce strong adhesive compositions. Coupling efficiency is defined as the number of molecules of coupled polymer divided by the number of molecules of coupled polymer plus the number of molecules of uncoupled polymer. Thus, when producing an SIS branched polymer, the coupling efficiency is shown by the following relationship:

$$\frac{\text{\# of Molecules of } SIS}{\text{\# of molecules of } SIS \text{ plus } SI}$$

Coupling efficiency can be determined theoretically from the stoichiometric quantity of coupling agent required for complete coupling or coupling efficiency can be determined by an analytical method such as gel permeation chromotography. Typical prior art coupling efficiency is from about 80% to almost 100%. In U.S. Pat. No. 4,096,203, coupling efficiency is controlled from about 20% to about 80%, preferably about 30% to about 70%. It is also within the scope of the present invention to blend polymers from processes of differeing coupling efficiency. For example, if a 60% efficiency is desired, then polymers from processes having an 80% efficiency and a 40% efficiency may be blended together. If the coupling efficiency is too low, i.e., less than 60%, the SAFT may fall below 71° C.

This coupling efficiency is controlled by a number of methods. One method to reduce coupling efficiency is to add less than the stoichiometric amount of coupling agent required for complete coupling of the polymers. Another means of reducing coupling efficiency is by the premature addition of a teminator compound. These terminators, such as water or alcohol, respond very quickly and could easily be employed to cut short complete coupling of the polymers. In addition, by performing the coupling reaction at elevated temperatures, such as above about 190° F., thermal termination of many of the living polymer groups (A—B—Li) occurs prior to coupling. The typical coupling conditions include a temperature of between about 150° and about 170° F. and sufficient pressure to maintain the reactants in a liquid phase.

Following the coupling reaction or when the desired coupling efficiency has been obtained, the product is neutralized such as by the addition of terminators, e.g. water, alcohol or other reagents, for the purpose of removing the lithium radical forming the nucleus for the condensed polymer product. The product is then recovered such as by coagulation utilizing hot water or steam or both.

As discussed above, for certain new applications in the diaper industry, it has been determined that an adhesive formulation must exhibit good adhesion and have a melt viscosity of less than 3100 cps at 350° F. and a shear adhesion failure temperature (SAFT) of greater than 71° C. The present invention provides a composition and an adhesive which satisfies these requirements. The composition is a predominantly branched S—I—S block copolymer composition which is comprised of linear polymeric blocks. In order to achieve the standards set forth above, the compositions and adhesives of the present invention must have the following characteristics:

(1) a polystyrene block molecular weight (PS MW) of greater than about 12,000, (2) a polystyrene content (PSC) of about 35% by weight of the block copolymer composition or less, and (3) an overall molecular weight ($M_s$—styrene equivalent molecular weight) and coupling efficiency which fall to the left of line A—A in FIG. 1.

It has been determined that if the above compositions do not have the above characteristics, then the adhesion, melt viscosity and SAFT criterion cannot be met. However, if the composition does have the above characteristics, then the adhesion, melt viscosity and SAFT criterion are satisfied.

FIG. 1 is a plot of coupling efficiency versus overall molecular weight based on data from the examples. The line A—A represents a contour line of constant melt viscosity of 3100 cps. If a point is to the right of this line, the melt viscosity will be too high. The shaded area to the left of the line represents the area of operability.

If the polystyrene content is greater than about 35%, the adhesion of the adhesives made from the composition is poor. Generally, for high SAFT, large styrene blocks are necessary, thus necessitating at least 12,000 PS MW to achieve an SAFT of 71° C. or greater. If the PS MW is greater than about 14,000, an SAFT of 75° C. or more can be achieved which will allow the adhesive to exhibit higher creep resistance.

A relatively narrow range of operable compositions is defined herein since the characteristics are interrelated. Thus, the PS MW must be greater than 12,000 for SAFT but cannot be too high because then either the PSC or the overall molecular weight will be too high. The PSC cannot be too low or the PS MW will be too low.

The concentration of the initiator can be regulated to control the molecular weight of the overall composition and of the polystyrene blocks. Generally, the initiator concentration is in the range of about 0.25 to about 50 millimoles per 100 grams of monomer. The required initiator level frequently depends upon the solubility of the initiator in the hydrocarbon diluent. The ratio of the initiator to the monomer determines the block size, i.e. the higher the ratio of initiator to monomer the smaller the molecular weight of the block.

Methods of controlling the molecular weights of the blocks and the overall polymer are quite well known. For instance, such are disclosed in U.S. Pat. No. 3,149,182, which states that the amount of monomer can be kept constant and different molecular weights can be achieved by changing the amount of catalyst or the amount of catalyst can be kept constant and different molecular weights can be achieved by varying the amount of the monomer, and in U.S. Pat. No. 3,231,635, the disclosures of which are herein incorporated by reference, and many others. A typical block copolymer composition within the scope of the present invention, having a coupling efficiency of 90%, a polystyrene block molecular weight of 15,000, a polystyrene content of 30% and an overall molecular weight of 183,000, was prepared by polymerizing styrene with TNPP as initiator at a monomer to initiator molar ratio of 144 to 1 and then terminating the polymerization, polymerizing isoprene at a monomer to initiator molar ratio of 283 to 1 and then terminating the polymerization and finally polymerizing polystyrene again under the same conditions as before.

It is necessary to add an adhesion promoting or tackifying resin that is compatible with the elastomeric conjugated diene block. A common tackifying resin is a diene-olefin copolymer of piperylene and 2-methyl-2-butene having a softening point of about 95° C. This resin is available commercially under the tradename Wingtack 95 and is prepared by the cationic polymerization of 60% piperylene, 10% isoprene, 5% cyclopentadiene, 15% 2-methyl-2-butene and about 10% dimer, as taught in U.S. Pat. No. 3,577,398. Other tackifying resins of the same general type may be employed in which the resinous copolymer comprises 20–80 weight percent of piperylene and 80–20 weight percent of 2-methyl-2-butene. The resins normally have softening points (ring and ball) between about 80° C. and about 115° C.

Other adhesion promoting resins which are also useful in the compositions of this invention include hydrogenated rosins, esters of rosins, polyterpenes, terpene-phenol resins and polymerized mixed olefins. To obtain good thermo-oxidative and color stability, it is preferred that the tackifying resin be a saturated resin, e.g., a hydrogenated dicyclopentadiene resin such as Escorez ® 5000 series resin made by Exxon or a hydrogenated polystyrene or polyalphamethylstyrene resin such as Regalrez ® resin made by Hercules.

The amount of adhesion promoting resin employed varies from about 20 to about 400 parts by weight per hundred parts rubber (phr), preferably between about 100 to about 350 phr. The selection of the particular tackifying agent is, in large part, dependent upon the specific block copolymer employed in the respective adhesive composition. In the manufacture of disposable articles such as diapers, sanitary napkins and bed pads, there is the additional consideration of having a substantially white or clear adhesive composition.

The adhesive composition of the instant invention may contain plasticizers, such as rubber extending plasticizers, or compounding oils or liquid resins. Rubber compounding oils are well-known in the art and include both high saturates content oils and high aromatics content oils. Preferred plasticizers are highly saturated oils, e.g. Tufflo ® 6056 oil made by Arco. The amounts of rubber compounding oil employed in the invention composition can vary from 0 to about 100 phr, and preferably between about 0 to about 60 phr.

Optional components of the present invention are stabilizers which inhibit or retard heat degradation, oxidation, skin formation and color formation. Stabilizers are typically added to the commercially available compounds in order to protect the polymers against heat degradation and oxidation during the preparation, use and high temperature storage of the adhesive composition.

Additional stabilizers known in the art may also be incorporated into the adhesive composition. These may be for protection during the life of the disposable article against, for example, oxygen, ozone and ultraviolet radiation. However, these additional stabilizers should be compatible with the essential stabilizers mentioned herein-above and their intended function as taught herein.

The adhesive compositions of the present invention are typically prepared by blending the components at an elevated temperature, preferably between about 130° C. and about 200° C., until a homogeneous blend is obtained, usually less than three (3) hours. Various methods of blending are known to the art and any method that produces a homogeneous blend is satisfactory.

The resultant adhesives may then preferably be used in a wide variety of product assembly applications. A particularly preferred application is their use in bonding polyethylene or polypropylene substrates to tissue, nonwovens or other polyethylene or polypropylene substrates using techniques involving multiple dispositions of small quantities of the adhesives according to conventional "multi-line" or "multi-dot" type constructions. Although the procedures used to manufacture these disposable constructions vary depending upon the particular manufacturer, the adhesive is generally extruded in lines (or dots) at regularly spaced intervals along the length of the article. The adhesive may be applied at temperatures as low as 250° F. An additional advantage of the adhesive of the present invention is that it can be effectively applied by spraying. The adhesive is usually applied to the polyethylene or polypropylene backing and subsequently the combination is mated with an absorbent inner core and tissue or nonwoven liner. Another important advantage of the compositions of the present invention is that they give much higher strength than similarly made linear polymers which also meet the industry standards. This is shown in the examples in Table 2.

In the following examples, the coupling efficiency was determined by the method described above. The melt viscosity was measured in centipoise-seconds (cps) by using a Brookfield Thermocell viscometer at 350° F. The SAFT was measured by 1" × 1" Mylar to Mylar lap joint with a 1 kg weight. SAFT measures the temperature at which the lap shear assembly fails under load. The molecular weights were determined by gel permeation chromatography as styrene equivalent molecular weight. The polystyrene content was determined by infrared spectroscopy.

A series of predominantly branched S—I—S block copolymers comprised of linear polymeric blocks were made and analyzed (samples 1-10). For comparative purposes, one commercially available product which is currently being touted for use in low temperature low viscosity applications was also analyzed (A). This is also thought to be a branched S—I—S block copolymer comprised of linear polymeric blocks but it can be seen that it does not meet the specifications of the present invention.

The block copolymer compositions were made according to the procedure discussed above. The coupling agent was TNPP. They were used to make adhesives by blending 25% polymer with 60% tackifying resin (Escorez ® 5300) and 15% plasticizer (Tufflo ® 6056). The formulations were stabilized with 1 phr of Irganox ® 1010.

TABLE 1

| Sample | MW(Ms) | C.E. (%) | PSC(%) | PS Block MW | MV(cps) | Adhesion | SAFT(°C.) | Acceptable |
|---|---|---|---|---|---|---|---|---|
| 1 | 187,000 | 87 | 26 | 12,300 | 2600 |  | 72 | Yes |
| 2 | 191,000 | 93 | 27 | 13,700 | 3570 |  | 74 | No |
| 3 | 183,000 | 92 | 27 | 12,900 | 3070 |  | 74 | Yes |
| 4 | 186,000 | 91 | 31 | 15,000 | 3230 |  | 80 | No |
| 5 | 189,000 | 93 | 31 | 15,400 | 3860 |  | 78 | No |
| 6 | 155,000 | 90 | 37 | 14,500 | 1960 | Poor | 75 | No |
| 7 | 152,000 | 90 | 36 | 15,000 | 2210 | Poor | 78 | No |
| 8 | 158,000 | 87 | 33 | 14,200 | 2190 |  | 76 | Yes |
| 9 | 191,000 | 77 | 30 | 15,500 | 2790 |  | 76 | Yes |
| 10 | 197,000 | 72 | 29 | 15,200 | 2620 |  | 76 | Yes |
| A | 223,000 | 67 | 19 | 11,100 | 2460 |  | 62 | No |

Samples 1, 3 and 8-10 are all acceptable since they meet all of the criterion stated above. Samples 2, 4 and 5 are all unacceptable since their melt viscosity is too high—see that they all appear to the right of line A—A in FIG. 1. Samples 6 and 7 are unacceptable because their PSC is more than about 35% and thus the adhesion is poor. The competitive material fails because its SAFT is much too low as a result of the polystyrene block molecular weight being below about 12,000.

Table 2 compares the tensile properties of Samples 8, 9 and 10 with a similarly made linear S—I—S block copolymer. Stress at 100% is the stress in psi at 100% strain. Tensile strength is the ultimate strength at break in psi. $E_B$ is the elongation % at break. All test results were performed on an Instrom tester. It can be seen that the tensile strength of the branched polymers is considerably greater than the tensile strength of the linear polymer.

TABLE 2

| | Sample | Tensile Properties | | | | |
|---|---|---|---|---|---|---|
| | | C.E. (%) | PSC (%) | Stress @ 100% | Tensile Strength | EB (%) |
| Linear |  | 84 | 30 | 170 | 2400 | 1050 |
| Branched | 8 | 87 | 33 | 305 | 3850 | 1000 |
|  | 9 | 77 | 30 | 165 | 3200 | 1025 |
|  | 10 | 72 | 29 | 215 | 2900 | 1050 |

I claim:

1. A branched styrene-isoprene-styrene block copolymer composition comprised of linear polymeric blocks for use in diaper adhesives which have a melt viscosity of less than 3100 cps at a temperature of 350° F. and a SAFT of greater than 71° C., said block copolymer composition characterized in that
   (a) the polystyrene block molecular weight is greater than about 12,000,
   (b) the polystyrene content is about 35% or less by weight of the block copolymer composition and (c) the molecular weight of the block copolymer composition and the coupling efficiency are chosen so that the melt viscosity of a diaper adhesive made with the composition is less than 3100 cps.

2. The composition of claim 1 having an SAFT of 75° C. or more wherein the polystyrene block molecular weight is greater than about 14,000.

3. A diaper adhesive comprising the block copolymer composition of claim 2 and from about 20 to about 400 parts by weight per 100 parts of the block copolymer composition of a tackifying resin that is compatible with the isoprene block.

4. A diaper adhesive composition having a melt viscosity of less than 3100 cps at a temperature of 350° F. and an SAFT of greater than 71° C. which comprises (a) a branched styrene-isoprene-styrene block copolymer composition comprised of linear polymeric blocks, said block copolymer composition characterized in that (i) the polystyrene block molecular weight is greater than about 12,000, (ii) the polystyrene content is about 35% or less by weight of the block copolymer composition and (iii) the molecular weight of the block copolymer composition and the coupling efficiency are chosen so that the melt viscosity of a diaper adhesive made with the composition is less than 3100 cps; and (b) from about 20 to about 400 parts by weight per 100 parts of the block copolymer composition of a tackifying resin that is compatible with the isoprene block.

* * * * *